US008686692B2

(12) United States Patent
Takahashi et al.

(10) Patent No.: US 8,686,692 B2
(45) Date of Patent: Apr. 1, 2014

(54) CHARGE CONTROL SYSTEM

(75) Inventors: Shin Takahashi, Mie-gun (JP); Shunichi Maeda, Chiryu (JP)

(73) Assignee: Denso Corporation, Kariya (JP)

( * ) Notice: Subject to any disclaimer, the term of this patent is extended or adjusted under 35 U.S.C. 154(b) by 471 days.

(21) Appl. No.: 13/039,758

(22) Filed: Mar. 3, 2011

(65) Prior Publication Data

US 2011/0215764 A1    Sep. 8, 2011

(30) Foreign Application Priority Data

Mar. 5, 2010 (JP) ................................. 2010-049712

(51) Int. Cl.
*H02J 7/00* (2006.01)

(52) U.S. Cl.
USPC ............................ 320/136; 320/132; 320/135

(58) Field of Classification Search
USPC .............. 320/132, 135, 136; 180/65.1, 65.21, 180/65.29, 65.31, 65.8; 307/10.7; 903/903, 903/907; 701/22
See application file for complete search history.

(56) References Cited

U.S. PATENT DOCUMENTS

| | | | | |
|---|---|---|---|---|
| 4,558,281 | A * | 12/1985 | Codd et al. ...................... | 324/433 |
| 6,344,732 | B2 * | 2/2002 | Suzuki ............................ | 320/132 |
| 6,509,720 | B2 * | 1/2003 | Ikeda ............................. | 320/135 |
| 7,317,300 | B2 * | 1/2008 | Sada et al. ..................... | 320/136 |
| 7,345,452 | B2 * | 3/2008 | Koo .............................. | 320/132 |
| 8,248,023 | B2 * | 8/2012 | Schwenke et al. ............ | 320/104 |
| 2001/0024104 | A1 | 9/2001 | Suzuki | |
| 2008/0100268 | A1 * | 5/2008 | Lim et al. ...................... | 320/136 |
| 2009/0025992 | A1 * | 1/2009 | Hayashi et al. .......... | 180/65.265 |
| 2011/0260692 | A1 * | 10/2011 | Chou et al. .................... | 320/136 |

FOREIGN PATENT DOCUMENTS

| | | |
|---|---|---|
| JP | A-2001-268719 | 9/2001 |
| JP | A-2003-018754 | 1/2003 |
| JP | A-2003-209935 | 7/2003 |
| JP | A-2003-217684 | 7/2003 |
| JP | A-2004-201411 | 7/2004 |
| JP | A-2005-57853 | 3/2005 |
| JP | A-2010-041913 | 2/2010 |

OTHER PUBLICATIONS

Jul. 23, 2013 Office Action issued in Japanese Patent Application No. 2010-049712 (with translation).

* cited by examiner

*Primary Examiner* — Drew A Dunn
*Assistant Examiner* — Steve T Chung
(74) *Attorney, Agent, or Firm* — Oliff PLC

(57) ABSTRACT

An in-vehicle charge control system includes a vehicle-state detector that detects a running state of a vehicle, a battery-state detector that detects a charge level of an in-vehicle battery, a fuel-efficiency-enhancement controller that predicts a discharge amount to be discharged by the battery under a discharge condition, sets a lower limit of the battery charge level on the basis of the battery charge level detected by the detector such that the lower limit of the battery charge level is higher than a battery charge level at which the battery begins to degrade by the predicted discharge amount, and controls a power generation amount of a vehicle generator according to the vehicle state detected by the detector. The system with this configuration can maintain the battery charge level and enhance the fuel efficiency simultaneously under practical use conditions.

5 Claims, 4 Drawing Sheets

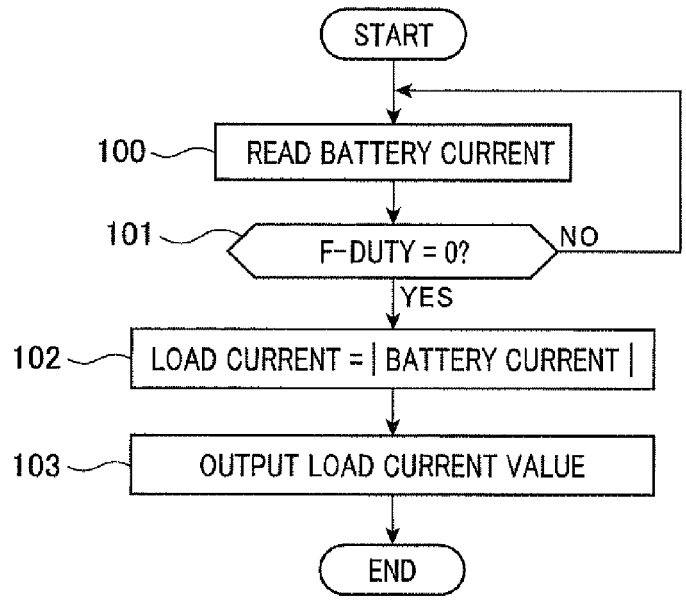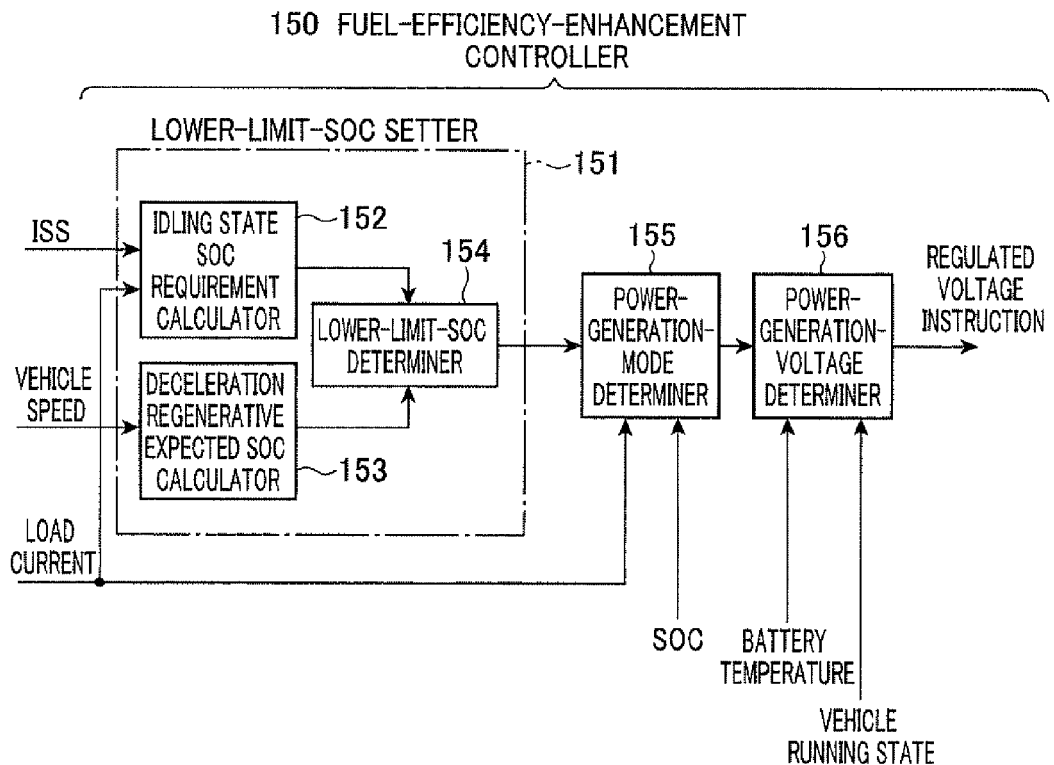

CHARGE CONTROL SYSTEM

CROSS-REFERENCE TO RELATED APPLICATION

This application is based on and claims the benefit of priority from earlier Japanese Patent Application No. 2010-49712 filed Mar. 5, 2010, the description of which is incorporated herein by reference.

BACKGROUND

1. Technical Field of the Invention

This invention relates to an in-vehicle charge control system that controls charging operations for an in-vehicle battery.

2. Related Art

Conventionally, as disclosed in Japanese Unexamined Patent Application Publication No. 2003-209935, there is known a charge control apparatus, which is composed of battery-state (voltage, current, and temperature) detection means, regulated-voltage control means (a microcomputer) and a regulator, controls a regulated voltage so that an integrated value of a discharging/charging current is zeroed. This apparatus is intended to prevent deterioration in fuel efficiency and battery liquid loss due to overcharge by controlling the regulated voltage so that the integrated value of the discharging/charging current is zeroed to thereby restrain power generation.

There is also known, as disclosed in Japanese Unexamined Patent Application Publication No. 2005-57853, another control apparatus, which is composed of driving-state (accelerated state, decelerated state, and low speed running state) determination means, battery-state determination means and power generation restraint means, determines a state of charge of the battery in the decelerated state, and determines to restrain power generation in the accelerated state on the basis of the determination result of the state of charge. This apparatus allows power generation control to be performed as a function of a vehicle running state on the basis of the battery state.

The above disclosed apparatuses allow the battery charge/discharge integrated value to be zeroed for a light electrical load, thereby improving the fuel efficiency and maintaining the battery charge level simultaneously. However, a heavy electrical load, such as an air conditioner or a heater, should be taken into account under practical use conditions, where a battery charge/discharge integrated value is not balanced (or zeroed). As a result of a resultant drop in battery charge level, the power generation control for the power generation restraint gets disabled.

As for combination of the above techniques with an idle stop function that is becoming more commonly used to further improve the fuel efficiency, since the power generation is stopped during idling, the battery charge level is further lowered. As a result of such a further drop in battery charge level, both the idle stop function and the power generation control for the power generation restraint become disabled, which prevents enhancement of the fuel efficiency.

In consideration of the foregoing, exemplary embodiments of the present invention are directed to providing a charge control system capable of both maintaining battery charge level and enhancing fuel efficiency under practical use conditions.

SUMMARY

In accordance with an exemplary aspect of the present invention, there is provided a charge control system comprising vehicle-state detection means for detecting a vehicle running state, battery-state detection means for detecting a charge level of an in-vehicle battery, power generation control means for predicting a discharge amount to be discharged by the battery under a discharge condition, setting a lower limit of the battery charge level on the basis of the battery charge level detected by the battery-state detection means such that the lower limit of the battery charge level is higher than a battery charge level at which the battery begins to degrade by the predicted discharge amount, and controlling a power generation amount of a vehicle generator according to the vehicle state detected by the vehicle-state detection means.

As described above, the charge control system implements power generation control adaptive for a large load current to thereby simultaneously maintain the battery charge level (SOC) and enhance the fuel efficiency of the vehicle under practical use conditions. The ISS-enabled vehicle implements the power generation control taking into account the discharge amount during idle stop, which leads to effective use of the idle stop function. When the load current is low, the charge control can suppress an extra power generation amount, which also leads to enhancement of the fuel efficiency. Further, the charge control can maintain a low battery charge level such that the regenerative power generation doesn't occur, therefore a large margin can be reserved for the regenerative power generation, which leads to further enhancement of the fuel efficiency.

BRIEF DESCRIPTION OF THE DRAWINGS

In the accompanying drawings:

FIG. 2 is a flowchart illustrating a load current detecting process performed by a load state detector;

FIG. 3 is a detailed block diagram of a fuel-efficiency-enhancement controller of the charge control system;

DESCRIPTION OF SPECIFIC EMBODIMENTS

The present inventions will be described more fully hereinafter with reference to the accompanying drawings. Like numbers refer to like elements throughout.

Figure 1:
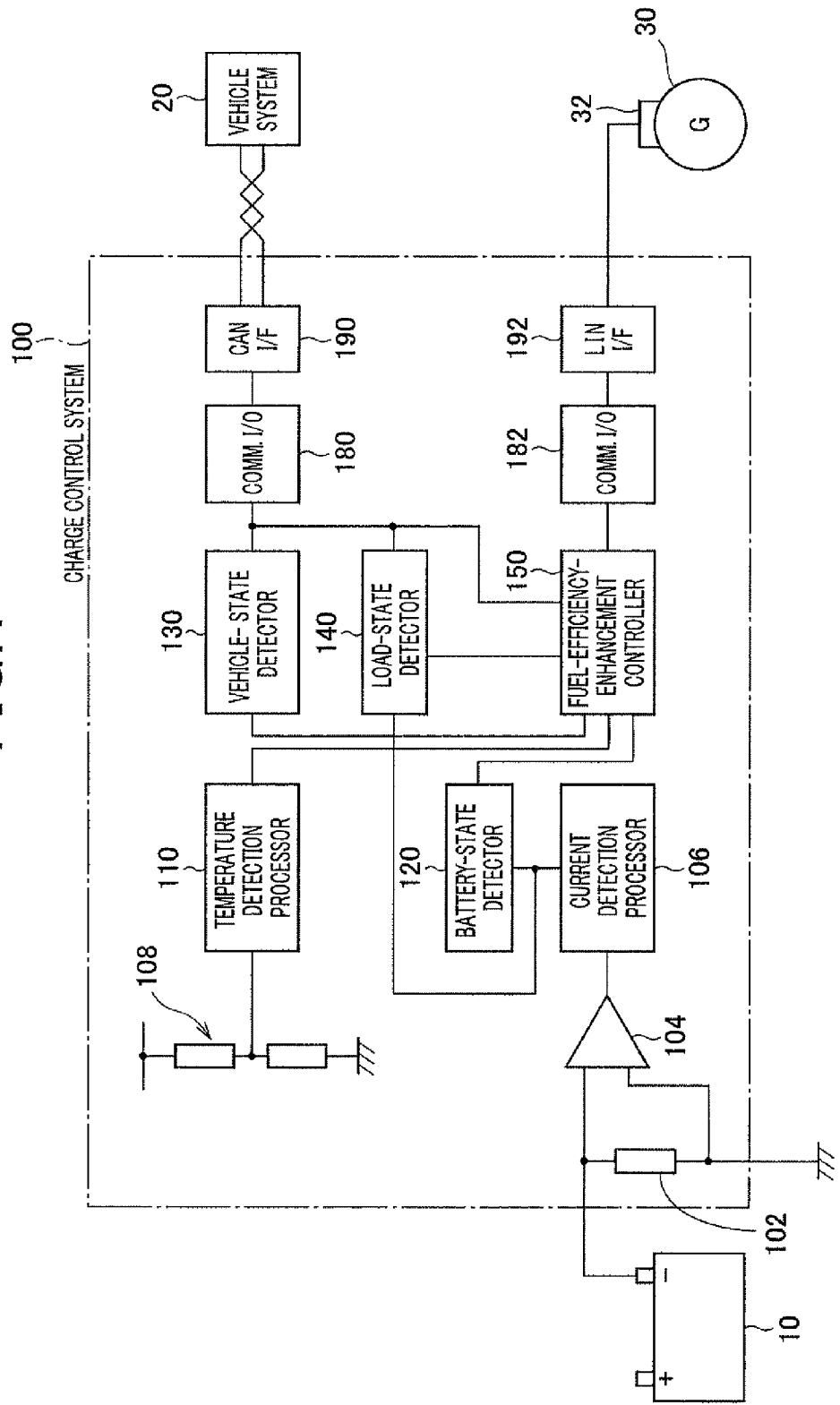
FIG. 1 is a schematic block diagram of a charge control system in accordance with one embodiment of the present invention.

FIG. 1 is a schematic block diagram of a charge control system in accordance with one embodiment of the present invention. The charge control system 100, which may be mounted in a vehicle such as a passenger car or a truck or the like, includes a shunt resistor 102, a differential amplifier 104, a current detection processor 106, a temperature detector 108, a temperature detection processor 110, a battery-state detector 120, a vehicle-state detector 130, a load-state detector 140, a fuel-efficiency-enhancement controller 150, a communication input/output unit (communication I/O) 180, 182, a CAN interface (CAN I/F) 190, a LIN interface (LIN I/F) 192.

The CAN interface 190 receives data from or transmits data to the vehicle system 20 in accordance with a CAN protocol. Various signals, such as a fuel-cut (F/C) signal indicative of fuel supply to the engine being blocked, a vehicle-speed signal indicative of a vehicle speed, a signal indicative of existence of Idling Stop & Start System (ISS), are outputted from the vehicle system 20. These signals are received by the charge control system 100 via the CAN interface 190 and the communication input/output unit 180.

The LIN interface 192 receives data from or transmits data to the vehicle generator 30 in accordance with a LIN protocol. The charge control system 100 controls a power generation state by variably setting a regulated voltage of the vehicle generator 30 as a function of a running state of the vehicle or the like. The power generation control is conducted by sending instructions (e.g., regulated-voltage set values) to the power-generation controller 32 mounted on the vehicle generator 30 via the communication input/output unit 182 and the LIN interface 192. An F-duty signal indicative of an ON/OFF state (F-duty) of a switching element of the vehicle generator 30 for supplying and stopping an excitation current is transmitted from the power-generation controller 32, and then received by the charge control system 100 via the LIN interface 192 and the communication input/output unit 182.

The shunt resistor 102, which is inserted between a negative-side terminal of the in-vehicle battery 10 and a vehicle body, detects a discharging/charging current that flows through the negative-side terminal of the battery 10. The differential amplifier 104 amplifies a voltage across the shunt resistor 102. The current detection processor 106 detects a current (a battery current) that flows through the shunt resistor 102 on the basis of an output voltage of the differential amplifier 104. The differential amplifier 104 and the current detection processor 106 constitute a current detection circuit that detects a discharging/charging current of the battery 10.

The temperature detector 108 takes an exemplary form of a voltage-dividing circuit composed of a resistor and a thermistor, where a divided voltage varies with changes in resistance of the thermistor as a function of the temperature. The temperature detection processor 110 detects a temperature of the charge control system 100 on the basis of an output voltage (i.e., a divided voltage) of the detector 108. The charge control system 100 of the present embodiment may be arranged in close contact with (or in proximity to) a side wall (or the upper surface) of the casing of the battery 10. A temperature detected by the temperature detector 108 is not only a temperature of the charge control system 100, but also a temperature of the battery 10. Alternatively, the charge control system 100 may not be disposed closely to the battery 10, where only the temperature detector 108 is disposed in close contact with (or in proximity to) the battery 10.

The battery-state detector 120 detects a SOC (State of Charge) of the battery 10 by integrating a discharging/charging current of the battery 10 detected by the current detection processor 106. For example, an initial (or a default) value of SOC is set in shipping or battery exchanging, and then the latest value of SOC is detected through updating the SOC on the basis of the integrated value of the discharging/charging current.

The vehicle-state detector 130 determines which running state the vehicle is in and whether or not the vehicle is ISS-enabled. Which running state the vehicle is in is determined, for example, on the basis of the fuel-cut signal or the vehicle-speed signal or the like outputted from the vehicle system 20, a result of which is to be outputted with a running-state signal indicative of the determined running state (accelerated state, stationary running state or decelerated state) of the vehicle. On the other hand, whether or not the vehicle is ISS-enabled is determined, for example, on the basis of a signal indicative of whether or not the ISS is installed in the vehicle received from the vehicle system 20, a result of which is to be outputted with a signal indicative of whether or not the vehicle is ISS-enabled.

The load-state detector 140 detects a total load current following through various electrical loads (not shown) connected to the battery 10 and the vehicle generator 30. In general, a relation between the battery current, the load current and a generated current (i.e., an output current of the vehicle generator 30) is given by the following equation.

(Battery current)=(Generated current)−(Load current)

According to this equation, the load current can be expressed as follows.

(Load current)=(Generated current)−(Battery current)

Supposing that in the present embodiment the load current is detected when the generated current is zero, the load current is given by the following equation.

(Load current)=|Battery current|

The load-state detector 140 detects, on the basis of the F-duty signal, the battery current outputted from the current detection processor 106 as the load current, when F-duty=0, i.e., when no excitation current is being supplied to the vehicle generator 30 and thus the generated current is zero.

In the foregoing, whether or not the generated current is zero is determined on the basis of the F-duty signal. Alternatively, the system 100 may further include a current sensor that detects an output current of the vehicle generator 30, thereby directly detecting that the generated current is zero.

FIG. 2 is a flowchart illustrating a load current detecting process performed by a load state detector 140. The load state detector 140 reads the battery current detected by the current detection processor 106 at step 100, and then at step 101 determines whether or not F-duty=0 on the basis of the F-duty signal received from the power-generation controller 32. If F-duty is non-zero, i.e., when the vehicle generator 30 is generating electrical power and the generated current is non-zero, it is determined that F-duty is non-zero, and then the process returns to step 100 to repeat the battery current reading step.

If F-duty=0, i.e., when the vehicle generator 30 is stopping the power generation and the generated current is zero, it is determined that F-duty is zero at step 101. Subsequently, at step 102, the load state detector 140 calculates the absolute value of the read battery current as the load current value, and then at step 103 outputs the calculated load current value to the fuel-efficiency-enhancement controller 150.

The fuel-efficiency-enhancement controller 150 predicts a discharge amount to be discharged by the battery under a discharge condition, on the basis of detection results of the battery-state detector 120, the vehicle-state detector 130 and the load state detector 140, and then controls the power generation state of the battery 10 such that a controlled SOC is higher than a SOC at which the battery 10 begins to degrade by the predicted discharge amount, that is, a controlled SOC minus a SOC at which the battery 10 begins to degrade is larger than the predicted discharge amount.

FIG. 3 is a detailed block diagram of a fuel-efficiency-enhancement controller 150. As shown in FIG. 3, the fuel-efficiency-enhancement controller 150 includes a lower-limit-SOC setter 151, a power-generation-mode determiner 155, a power-generation-voltage determiner 156. The lower-limit-SOC setter 151 includes a idle state-SOC-requirement calculator 152, a deceleration regenerative expected SOC calculator 153, a lower-limit-SOC determiner 154.

On the assumption that the battery 10 discharges in an idle state or during idling, the idle state-SOC-requirement calculator 152 predicts a discharge amount of the battery 10 to be discharged in a subsequent idle state to determine a SOC to be reserved until the vehicle enters the subsequent idle state as a "idle state SOC requirement". For example, the battery may be assumed to degrade when the SOC is equal to or less than 88%.

(For ISS-Enabled Vehicle)

An engine of an ISS-enabled vehicle is stopped during idling and thus power generation is also stopped during idling.

Accordingly, idle state SOC requirement (%) can be calculated by using the following equation.

$$\text{(Idle state SOC requirement)} = ((\text{Load current }(A) \times \text{Idling time }(s))/(\text{Battery capacity }(Ah) \times 3600)) \times 100 + 88 \quad (1)$$

(For Non ISS-Enabled Vehicle)

For a non ISS-enabled vehicle, a way to calculate the idle state SOC requirement depends on whether or not the load current during idling is larger than a maximum generated current during idling.

When (Load current)<(Upper limit of output current of the vehicle generator 30 during idling), the SOC is not lowered even if an electronic load is used. Therefore, (Idle state SOC requirement)=88%

When (Load current)≥(Upper limit of output current of the vehicle generator 30 during idling), the idle state SOC requirement can be calculated by using the following the equation.

$$\text{(Idle state SOC requirement)} = (((\text{Load current }(A) - \text{Maximum generated current during idling }(A)) \times \text{Idling time }(s))/(\text{Battery capacity }(Ah) \times 3600)) \times 100 + 88 \quad (2)$$

The "idling time" appearing in the above equations (1), (2) is a predicted idling time (or a predicted discharge time) of a subsequent idle state. The idling time may be given by a predetermined period of time that is set according to an envisaged running state of the vehicle or an average idling time taken over past idling times. The predetermined time period may be 1.5 times 85 seconds, i.e., approximately 130 seconds, where 85 seconds is the longest time period defined in EU- or JC08-mode and the factor of 1.5 allows a margin for safety. When the predetermined time period is used, a particular process is not required to acquire the idling time (or a predicted discharge time), which leads to processing load reduction, thus leading to cost reduction. When an average idling time taken over past idling times is used, an appropriate discharge time adapted for an actual running state can be used, which leads to more accurate charge control.

Figure 4:
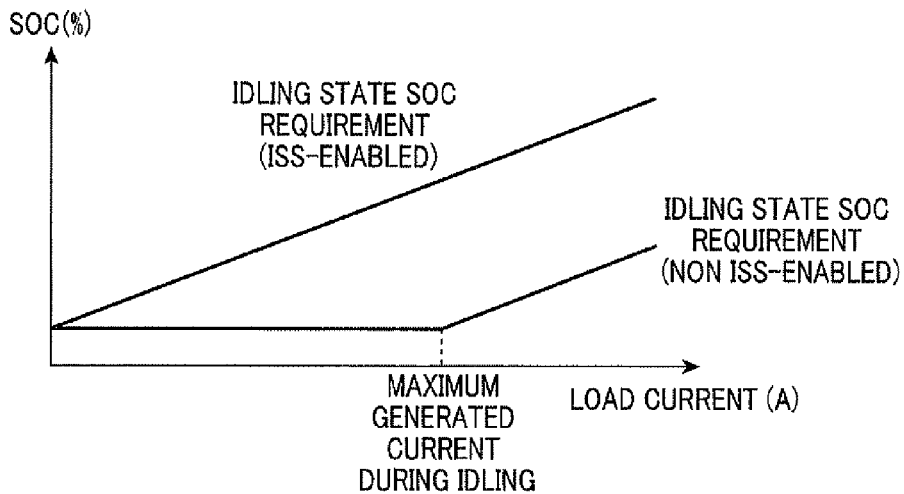
FIG. 4 is a graph of an idle state SOC requirement with respect to a load current.

FIG. 4 is a graph of an idle state SOC requirement with respect to a load current. As for the ISS-enabled vehicle, as shown in FIG. 4, when the vehicle enters the idle state the engine is stopped. Since power generation of the vehicle generator 30 is also stopped, the battery 10 begins to discharge. Therefore, an additional SOC will be required corresponding to a discharge amount as a function of the load current.

On the other hand, as for the non ISS-enabled vehicle, when the load current consumption can be purveyed by the power generation of the vehicle generator 30, an additional SOC that takes into account the load current consumption is not required. In cases where the load current consumption exceeds the power generation capacity of the vehicle generator 30 (a maximum generated current during idling), an additional SOC corresponding to the load current consumption minus the power generation capacity of the vehicle generator is required.

The deceleration regenerative expected SOC calculator 153 calculates a deceleration regenerative expected SOC that is a SOC expected to be restored by the regenerative power generation during deceleration of the vehicle. For example, when the vehicle speed is equal to or lower than 15 km/h, the deceleration regenerative expected SOC is set to zero. When the vehicle speed is higher than 15 km/h, the deceleration regenerative expected SOC is calculated by using the following the equation.

$$\text{(Deceleration regenerative expected }SOC) = \quad (3)$$
$$\text{(Regenerative average charging current)} \times$$
$$\text{(Regenerative expected time)} \times$$
$$(1/(\text{Battery capacity }(Ah) \times 3600)) \times 100$$

Figure 5:
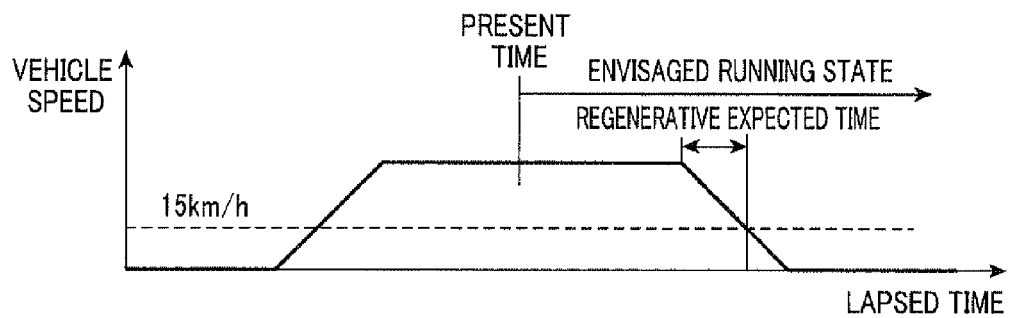
FIG. 5 is a graph of a vehicle speed with respect to a lapsed time illustrating a regenerative expected time.

FIG. 5 is a graph of a vehicle speed with respect to a lapsed time to explain a regenerative expected time. As shown in FIG. 5, a regenerative expected time that it takes for the vehicle to slow down from the present vehicle speed to 15 km/h. For example, using 2.9 (km/h)/s as an average change rate of the vehicle velocity with respect to time during deceleration in the EU-mode, the deceleration regenerative expected SOC becomes as follows.

$$\text{(Deceleration regenerative expected }SOC) = \quad (4)$$
$$\text{(Regenerative average charging current)} \times$$
$$((\text{Vehicle speed} - 15 \text{ (km/h)})/2.9) \times$$
$$(1/(\text{Battery capacity }(Ah) \times 3600)) \times 100$$

The lower-limit-SOC determiner 154 calculates a lower limit SOC, which is obtained by subtracting the deceleration regenerative expected SOC calculated by the deceleration regenerative expected SOC calculator 153 from the idle state SOC requirement calculated by the idle state-SOC-requirement calculator 152. The lower limit SOC indicates what SOC the present SOC should be higher than such that the SOC is kept equal to or higher than 88% even if the battery discharges in a subsequent idle state. As mentioned above, the battery degrades when the SOC is equal to or less than 88%.

Figure 6:
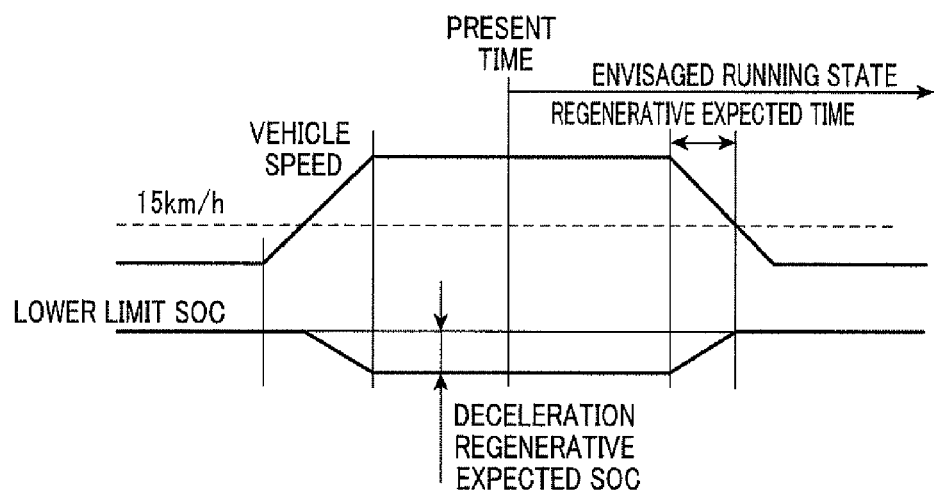
FIG. 6 is a graph illustrating a lower limit SOC.

FIG. 6 is a graph illustrating the lower limit SOC. When the vehicle speed exceeds 15 (km/h), a regenerative charge amount will be generated by the regenerative power generation as a function of the vehicle speed minus 15 (km/h). Therefore, as shown in FIG. 6, the lower-limit SOC in the presence of the regenerative generation may be set lower than the lower limit SOC in the absence of the regenerative generation by the deceleration regenerative expected SOC.

The power-generation-mode determiner 155 determines a power generation mode of the vehicle power generator 30 on the basis of the present SOC detected by the battery-state detector 120, the lower limit SOC determined by the lower-limit SOC determiner 154, and the load current detected by the load-state detector 140.

Figure 7:
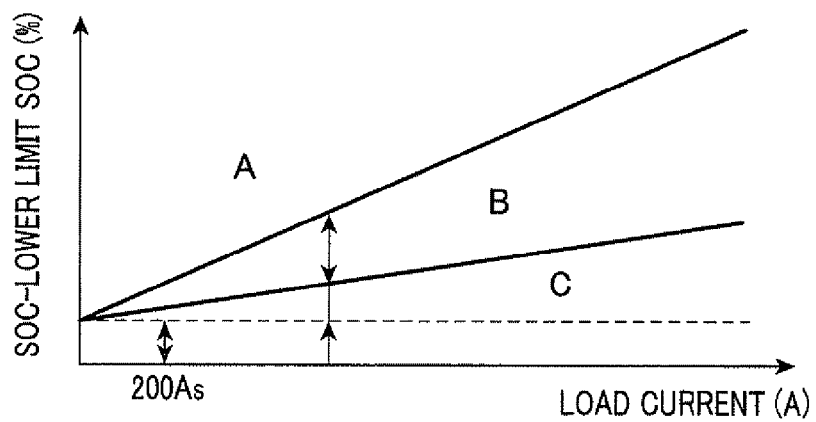
FIG. 7 schematically illustrates a power-generation-mode determining process.

FIG. 7 illustrates a power generation mode determining process. The horizontal axis shows the load current, and the vertical axis shows the present SOC minus the lower limit SOC. In FIG. 7, the region A is a region where the present SOC has a large enough margin. In this region, for the purpose of enhancing the fuel efficiency, the power generation mode during acceleration and the power generation mode during stationary running are both set to the "power generation restraint mode". The region B is a region where the present SOC doesn't have a large enough margin. In this region, for the purpose of maintaining the present SOC, the power-generation mode during acceleration is set to the "power generation restraint mode", and the power-generation mode during stationary running is the "constant-voltage power generation mode". Finally, the region C is a region where the present SOC doesn't have an enough margin. In this region, for the purpose of restoring the SOC, the power generation mode during acceleration and the power generation mode during stationary running are both set to the "charge-level restoration power generation mode".

Assuming that a current of 100 A continues for one second during an electrical power steering (EPS) system being activated and a safety factor of 2 is applied, "200 As" appearing in FIG. 7 is a margin such that the SOC is kept equal to or higher than 88% even if a heavy electrical load is activated for a short time period. In the present embodiment, the regenerative power generation shall be performed when the present SOC is below 95% during deceleration of the vehicle.

For example, on the assumption that the SOC is reserved such that the SOC allows the power generation restraint to be performed even during the longest term acceleration in the EU-mode (41 seconds), boundaries of the regions A, B are defined. Also, on the assumption that there exists a transient time period from the discharge state to the charge state of the battery 10 during the power generation being stopped (e.g., 10 seconds), boundaries of the regions B, C are defined.

The power-generation-mode determiner 155 sets the power generation mode to the "regenerative power generation mode" when the SOC is below a predetermined value (e.g., 95%) during deceleration, and sets the power generation mode to the "power generation restraint mode" when the SOC is equal to or higher than the predetermined value.

The power-generation-voltage determiner 156 sets a regulated-voltage target value on the basis of a power generation mode determined by the power-generation-mode determiner 155, a battery temperature determined by the temperature detection processor 110, and a running state signal outputted from the vehicle-state detector 130, and determines a regulated-voltage instruction value for the power-generation controller 32 such that a voltage change rate with respect to time becomes a predetermined value (e.g., 2 V/s). The determined regulated-voltage instruction value is transmitted to the power-generation controller 32 via the communication inputting/outputting unit 182 and the LIN interface 192. Specifically, a regulated-voltage target value during idling, a target regulated-voltage value during acceleration/stationary running, and a regulated-voltage target value during deceleration are set as follows, respectively.

(During Idling)

The regulated-voltage target value during idling is set to 12.8 V.

(During Acceleration/Stationary Running)

Figure 8:
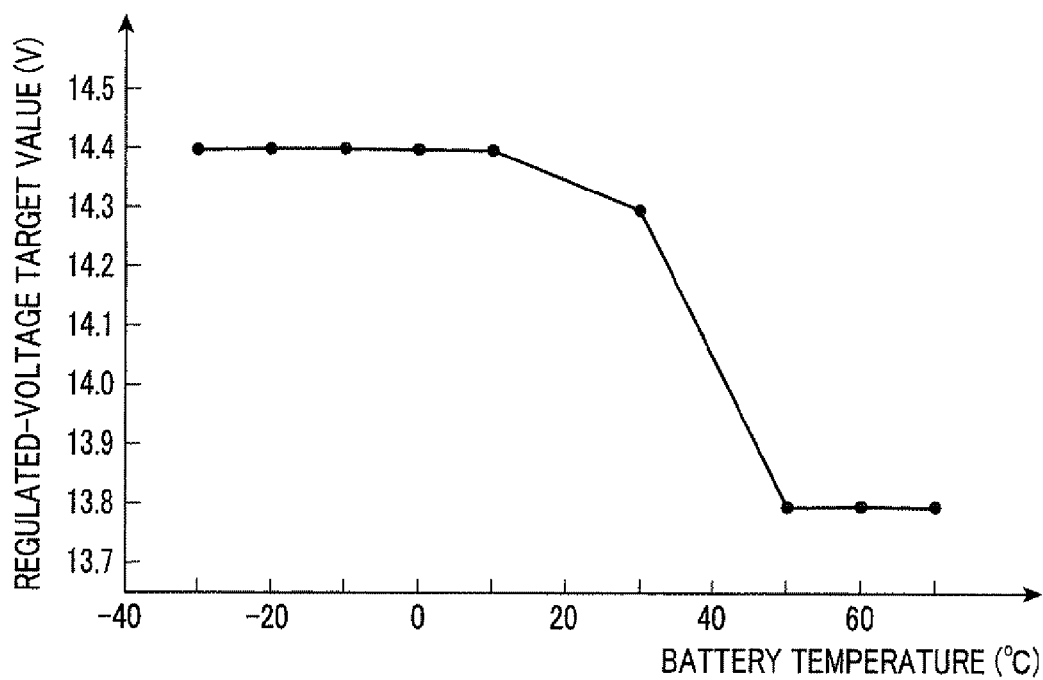
FIG. 8 is an exemplary graph of a regulated-voltage target value corresponding to the charge-level restoration power generation.

The power generation mode and the regulated-voltage target value during acceleration/stationary running are set as in Table 1. FIG. 8 is an exemplary graph of a regulated-voltage target value corresponding to the charge-level restoration power generation, which is included in Table 1.

TABLE 1

| | | Running state | |
|---|---|---|---|
| | | Acceleration | Stationary |
| Power generation mode | Acceleration: Power generation restraint Stationary: Power generation restraint | Power generation restraint (12.5 V) | Power generation restraint (12.5 V) |
| | Acceleration: Power generation restraint Stationary: Constant-voltage power generation | Power generation restraint (12.5 V) | Constant-voltage power generation (13.8 V) |
| | Acceleration: Charge-level restoration Stationary: Charge-level restoration | Charge-level restoration (See FIG. 8) | Charge-level restoration (See FIG. 8) |

As shown in FIG. 8, since the regulated voltage at which the capacity restoration is allowed depends on the battery temperature, the power-generation-voltage determiner 156 sets the target regulated voltage at which the capacity restoration is allowed on the basis of the battery temperature detected by the temperature detection processor 110.

(During Deceleration)

When the SOC is lower than 95% during deceleration of the vehicle, the power generation mode is set to the "regenerative power generation mode", where the regulated-voltage target value is set to 14.5 V+α. α is a voltage drop through the wiring from the vehicle generator 30 to the battery 10, which should be taken into account in setting the regulated-voltage target value.

On the other hand, when the SOC is equal to or higher than 95% during deceleration of the vehicle, the power-generation mode is set to the "power generation restraint mode", where the regulated-voltage target value is set to 12.5 V.

As described above, the charge control system 100 of the present embodiment implements power generation control adaptive for a large load current to thereby simultaneously maintain the battery charge level (SOC) and enhance the fuel efficiency of the vehicle under practical use conditions. The ISS-enabled vehicle implements the power generation control taking into account the discharge amount during idle stop, which leads to effective use of the idle stop function and thus to enhancement of the fuel efficiency. When the load current is low, the charge control can suppress an extra power generation amount, which also leads to enhancement of the fuel efficiency. Further, the charge control can maintain a low battery charge level such that the regenerative power generation doesn't occur, therefore a large margin can be reserved for the regenerative power generation, which leads to further enhancement of the fuel efficiency.

The battery 10 discharges when the load current exceeds the power generation amount of the vehicle generator 30. Accurate grasp of such a condition and accurate charge control can be achieved by calculating the idle state SOC requirement by using the equation (2), thereby more reliably maintaining the battery charge level and enhancing the fuel efficiency simultaneously.

The lowest rotation speed of the vehicle generator 30 occurs during idling. The battery 10 is also likely to discharge under such a condition. Appropriate charge control can be performed taking into account the discharge during idling to maintain the battery charge level and enhance the fuel efficiency. Since the idle state can be readily detected, a processing load can be reduced.

In addition, the discharge amount can be predicted by subtracting a maximum power generation amount of the vehicle generator 30 under the discharge condition from the load current value and then multiplying the resultant value by a predicted discharge time (i.e., an idling time), thereby predicting in real time the discharge amount under practical use conditions, which leads to accurate charge control.

The charge control apparatus 100 of the present embodiment further includes the load state detector 140 that detects a load current that flows through an electrical load connected to the battery 10, which leads to accurate determination of a discharge amount depending on an actual usage state of the electrical load, thereby leading to more accurate charge control. In particular, since a value of the discharging current of the battery 10 during the vehicle generator 30 being generating no electrical power can be regarded as a load current value, it is possible to determine the load current only by detecting the discharging/charging current of the battery 10, which leads to cost reduction as compared with cases where a load current is directly detected.

It is preferable to use a predetermined value set depending on an envisaged running state as the aforementioned predicted discharge time. This can eliminate necessity for a particular process to acquire a predicted discharge time, which leads to cost reduction through reduction of a processing load.

It is also preferable to determine the aforementioned predicted discharge time on the basis of the past discharge durations. It becomes possible to use an appropriate predicted discharge time according to an actual running state of the vehicle, which leads to accurate charge control.

As described above, the present invention implements appropriate power generation control adaptive for a large load current, thereby simultaneously maintaining the battery charge level and enhancing the fuel efficiency under practical use conditions.

What is claimed is:

1. A charge control system comprising:

vehicle-state detection means for detecting a running state of a vehicle;

battery-state detection means for detecting a charge level of an in-vehicle battery: and power generation control means for predicting a discharge amount to be discharged by the battery under a discharge condition, setting a lower limit of the battery charge level on the basis of the battery charge level detected by the battery-state detection means such that the lower limit of the battery charge level is higher than a battery charge level at which the battery begins to degrade by the predicted discharge amount, and controlling a power generation amount of a vehicle generator according to the vehicle state detected by the vehicle-state detection means, wherein the discharge amount is predicted by subtracting a maximum power generation amount of the vehicle generator under the discharge condition from a load current value and then multiplying the resultant value by a predicted discharge time.

2. The system of claim 1, further comprising load-state detection means for detecting a load current that flows through an electrical load connected to the in-vehicle battery.

3. The system of claim 2, wherein the load-state detection means uses, as the load current, the discharging current of the battery during power generation of the vehicle generator being stopped.

4. The system of claim 1, wherein the predicted discharge time is set to a predetermined time period defined according to an envisaged running state of the vehicle.

5. The system of claim 1, wherein the predicted discharge time is set to an average time period taken over a plurality of past discharge durations.

* * * * *